United States Patent [19]

Groner

[11] Patent Number: 5,668,928
[45] Date of Patent: Sep. 16, 1997

[54] SPEECH RECOGNITION SYSTEM AND METHOD WITH AUTOMATIC SYNTAX GENERATION

[75] Inventor: Gabriel F. Groner, Palo Alto, Calif.

[73] Assignee: Kor Team International, Inc., Los Gatos, Calif.

[21] Appl. No.: 381,202

[22] Filed: Jan. 31, 1995

[51] Int. Cl.⁶ ............................... G10L 9/00; G10L 5/06
[52] U.S. Cl. ..................... 704/243; 704/251; 704/257
[58] Field of Search ........................... 395/2, 2.25, 2.26, 395/2.27, 2.33, 2.52, 2.53, 2.6, 2.61, 2.62, 2.63, 2.64, 2.65, 2.66, 149

[56] References Cited

U.S. PATENT DOCUMENTS

| | | | |
|---|---|---|---|
| 5,228,110 | 7/1993 | Steinbiss | 395/2 |
| 5,384,892 | 1/1995 | Strong | 395/2.52 |
| 5,390,279 | 2/1995 | Strong | 395/2 |
| 5,425,128 | 6/1995 | Morrison | 395/2.52 |
| 5,444,617 | 8/1995 | Merialdo | 395/2.47 X |

FOREIGN PATENT DOCUMENTS

| | | |
|---|---|---|
| 602 296 A1 | 6/1994 | European Pat. Off. . |
| 618 565 A2 | 10/1994 | European Pat. Off. . |
| WO94/16435 | 7/1994 | WIPO . |
| WO94/16455 | 7/1994 | WIPO . |

OTHER PUBLICATIONS

"Phonetic Engine 400, Speech Recognition System, System Development Kit, Version 2.0"; ProVoice Programmer's Guide; 1993 by Speech Systems Incorporated.

*Primary Examiner*—Krista M. Zele
*Assistant Examiner*—Scott L. Weaver
*Attorney, Agent, or Firm*—Flehr Hohbach Test Albritton & Herbert LLP

[57] ABSTRACT

A syntax rule authoring system automatically generates syntax rules for an application program's predefined inputs, thereby enabling the application program to be used with a syntax based speech recognition system. The syntax rule authoring system includes memory for storing an application program having an associated set of user selectable predefined inputs. The syntax rule authoring system stores in a first data structure for each predefined input an associated longest word sequence for uniquely identifying that predefined input. A word sequence generation procedure automatically generates, for each predefined input, a set of potential identifying word sequences. Each generated potential identifying word sequence includes a subset of the words in the associated longest word sequence. The potential identifying word sequences for all the predefined inputs are stored a second data structure. A redundant word sequence elimination procedure identifies redundant sets of matching word sequences in the second data structure, where each redundant set of matching word sequences includes potential identifying word sequences for at least two distinct predefined inputs whose word sequences satisfy predefined match criteria. A syntax generation procedure then generates syntax rules, each generated syntax rule corresponding to those of the potential identifying word sequences for a distinct predefined input that are not included in any of the identified redundant sets. The generated syntax rules are suitable for use in a syntax based speech recognition system.

18 Claims, 10 Drawing Sheets

Hospital Admission Form
☐ Medical Center A
☐ Medical Center B

NURSING ADMINISTRATION DATA BASE
Reason for Admission: _____
_____
_____
_____
_____

| Language Spoken:<br>☐ English ☐ Other<br>☐ Spanish<br>☐ Interpreter Available | Current Medications: | Pretests:<br>Lab: |
|---|---|---|
| Weight: ____ ☐Lb ☐Kg<br>Height ____ ☐Lb ☐Kg<br>☐ Reported ☐ Weighed<br>Information From:<br>☐ Patient<br>☐ _____ | Allergies (Med; Food): | EKG. |

1. H.E.E.N.T   ☐ Denies Problems
☐ Glaucoma        ☐ Cataract R/L        ☐ Diplopia
☐ Blind R/L       ☐ Hearing Loss R/L    ☐ Low Vision: R/L
☐ Sinus Problems  ☐ Sore Throat         ☐ Nose Bleed

...

2. CARIDO-CIRCULATORY    ☐ Denies Problems
☐ Edema          ☐ Bruising              ☐ Pain
☐ Hypertension   ☐ Hx CAD                ☐ Pacemaker
☐ Hx MI          ☐ Vascular Access Devices

SPEECH RECOGNITION SYSTEM AND METHOD WITH AUTOMATIC SYNTAX GENERATION

The present invention relates generally to speech recognition systems as applied to data input and general computer use, and particularly to a system and method for generating speech syntaxes for multiple speech input contexts so as to automatically provide the least restrictive syntax possible while still providing a unique syntax identification for each defined input in each defined context.

BACKGROUND OF THE INVENTION

Many database programs include user interface software and programming tools for defining data entry forms, and for linking fields in those data entry forms to fields in database tables. A related application, System and Method for Generating Database Input Forms, U.S. Ser. No. 08/328,362, filed Oct. 25, 1994, teaches a system and method for converting an existing non-computerized (i.e., paper) data entry form into a computer based data entry form that uses speech recognition for verbal data entry application Ser. No. 08/328,362, pending is hereby incorporated by reference.

The present invention provides a tool for automatic generation of the speech input part of an application program without requiring the application developer to know anything about speech recognition systems. The application developer provides only a set of "menu files" listing the longest word sequence for identifying each predefined input to the program, and the present invention then generates all the syntax and dictionary files needed to enable the developer's application program to be used with a syntax based speech recognition system.

Phoneme based speech recognition systems (also called extendable vocabulary speech recognition systems) are considered desirable because they are speaker independent: there is no need to train the speech recognition system to learn each user's voice patterns. Syntax based speech recognition systems are speech recognition systems that define a set of alternate verbal inputs for each predefined multiple word input value. The set of alternate verbal inputs accepted as matching a particular multiple word input value is defined by a "syntax rule," sometimes called a syntax statement. Syntax based speech recognition systems are usually also phoneme based speech recognition systems, although it would be possible to have a syntax based speech recognition system that is not phoneme based. The preferred embodiment of the present invention uses phoneme based word recognition and syntax based word sequence recognition.

In a typical application of a speech recognition system, there will be either one speech input context for an entire associated application program, or there will be multiple contexts, such as one for each pull down menu of the application program and one for each special dialog box used by the application program. Alternately, in a data entry context, each defined region of a data entry form can be defined as a separate context. Each context, whether in the application program or data entry form, will typically include a set of global commands (such as "save file," "help," or "exit program") as well as a set of navigation commands (such as "tools menu") for switching to another context.

Within any given context, it is desirable that the speech recognition system be as flexible as possible as to the set of words the user can speak to identify each predefined input value, while still uniquely identifying that predefined input value. In the past, this has been accomplished by a person, typically a computer programmer, manually generating a syntax statement for each predefined input value, where the syntax statement defines all word sequences that will be accepted as identifying that predefined input value. For example, a syntax statement for the input value "move to back" may be of the form:

TAG23→move back|move to back or

TAG23→move (to) back where the symbol "|" is the logical OR operator and parentheses indicate that the word "to" is optional. However, although the author of the above statement may not have thought of it, in the context of this predefined input value, the word "back" might be sufficient to uniquely identify it. In other words, the syntax statement should probably read:

TAG23→(move) (to) back indicating that both the word "move" and the word "to" are optional.

When a predefined input value has more than the three words of the above example, defining the optimal syntax for the input value gets considerably more complex. For instance, for a predefined input value having seven words, there are 127 potential word sequences that maintain the same word order as the original sequence and that might acceptably and uniquely identify that input value.

Of course, the sequences of words that uniquely identify an input value depend on the other predefined input values within the same defined context. Thus, if the same context that included the input value "move to back" included the input value "back one step", then the word "back" could not be used to uniquely identify either of those input values. In contexts with even ten or so predefined input values, checking for all possible conflicts between word sequences can be difficult to do properly. In contexts with several dozen or more input values, this task is extremely difficult for a human to perform manually without spending inordinate amounts of time on the task. An example of where such large contexts can arise are applications where the application designer has decided to make as many commands as possible available while minimizing verbal navigation command requirements.

It is common for many data entry forms, and for many application programs, to use abbreviations, numbers, ordinals, acronyms and initialisms to identify predefined input values and commands. The corresponding syntax statements for a speech recognition system must include equivalent word sequences that correspond to the standard verbalizations of such abbreviations, numbers, ordinals, acronyms and initialisms.

The difference between an acronym and an initialism is as follows. An acronym is formed from pronounceable syllables, even if it represents a "made up word," while an initialism is not pronounceable except as a sequence of letters and numbers. Thus, "IBM" and "YMCA" are initialisms, while "NASA" and "UNICEF" are acronyms. Some words, such as "MSDOS" and "PCNET" are a mix of acronym and initialism components.

In order for a speech recognition system to work with such data entry forms and application programs, the syntax statements defining the range of word sequences for each predefined input value must include equivalent verbal word sequences. For initialisms, this means the user will need to speak the same or substantially the same sequence of letters as found in the initialism. For an acronym, the user will need to speak the equivalent verbalization of the acronym, and thus the corresponding syntax statement will need to accurately reflect the equivalent verbalization. For an abbreviation, the corresponding syntax statement will need to include the corresponding full word. For numbers and ordinals, the syntax statement will need to include the equivalent full text words.

It is therefore a goal of the present invention to provide a speech recognition system in which syntax statements for all predefined input values for all contexts are automatically generated.

Another goal of the present invention is for the automatically generated syntax statement to provide maximal flexibility in terms of word sequences accepted as identifiers for each predefined input value while still providing a unique syntax identification for each predefined input value in each defined context.

SUMMARY OF THE INVENTION

In summary, the present invention is a syntax rule authoring system that automatically generates syntax rules for an application program's predefined inputs, thereby enabling the application program to be used with a syntax based speech recognition system.

The syntax rule authoring system includes memory for storing an application program having an associated set of user selectable predefined inputs. The system stores in a first data structure for each predefined input an associated longest word sequence for uniquely identifying that predefined input. The syntax rule generation procedure begins by generating, for each predefined input, a set of potential identifying word sequences. Each generated potential identifying word sequence includes a subset of the words in the associated longest word sequence. The potential identifying word sequences for all the predefined inputs are stored in a second data structure.

A redundant word sequence elimination procedure identifies redundant sets of matching word sequences in the second data structure, where each redundant set of matching word sequences includes potential identifying word sequences for at least two distinct predefined inputs whose word sequences satisfy predefined match criteria. A syntax generation procedure then generates syntax rules, including one distinct syntax rule for each predefined input. Each generated syntax rule represents those of the potential identifying word sequences for a distinct predefined input that are not included in any of the identified redundant sets. The generated syntax rules are suitable for use in a syntax based speech recognition system.

BRIEF DESCRIPTION OF THE DRAWINGS

Additional objects and features of the invention will be more readily apparent from the following detailed description and appended claims when taken in conjunction with the drawings, in which:

FIG. 2 depicts an example of a paper based data entry form.

DESCRIPTION OF THE PREFERRED EMBODIMENTS

Figure 1:
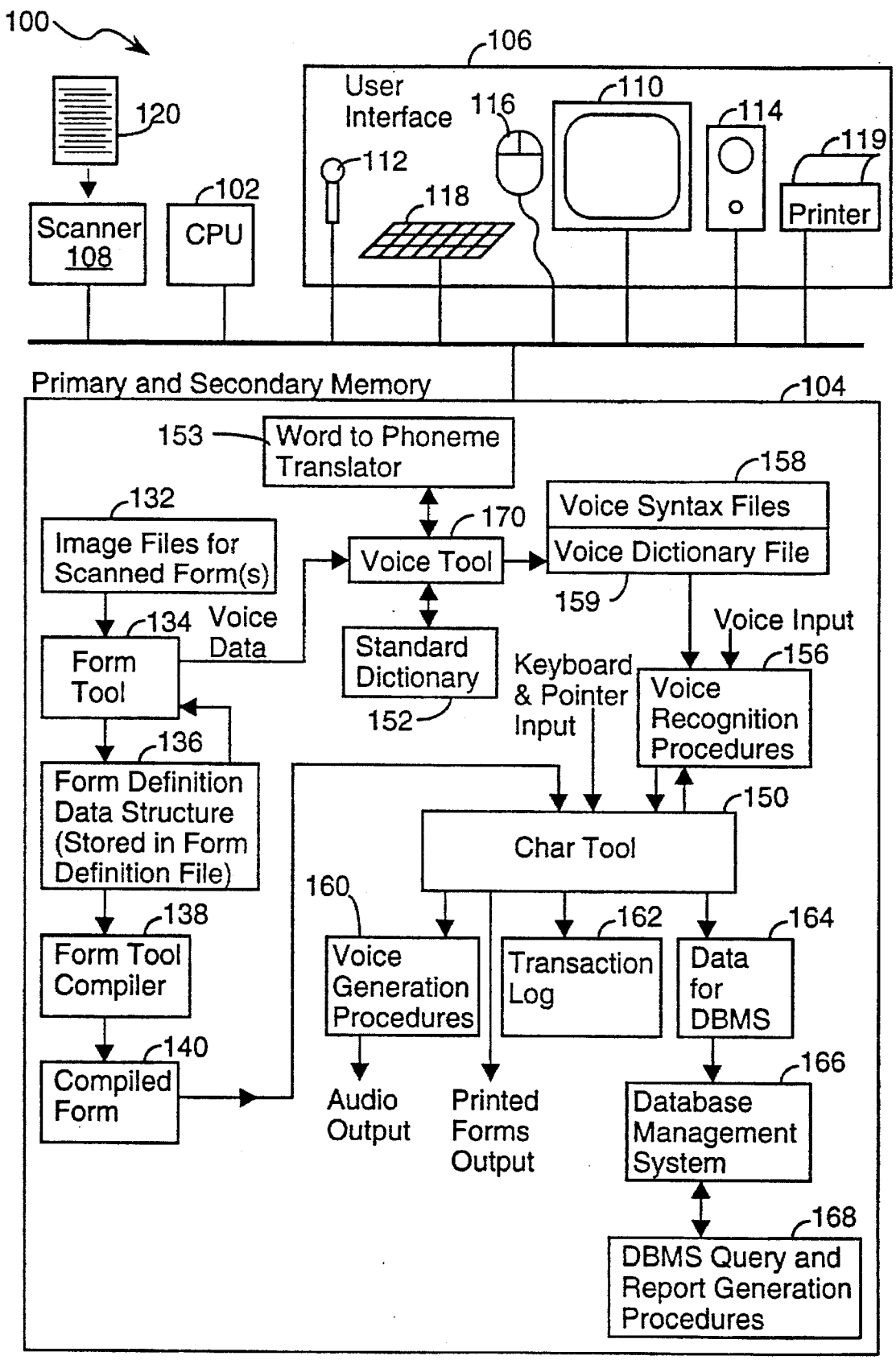
FIG. 1 is a block diagram of a computer system for converting paper based data entry forms into computer based data entry forms and for then using the computer based data entry forms to collect and store data, where data entry using a variety of input devices, including voice input devices, is supported.

Referring to FIG. 1, a computer system 100 incorporating the present invention includes a central processing unit 102, primary and secondary computer memory subsystems 104, a user interface 106 and a document scanner 108. The user interface 106 typically includes a display 110, a microphone 112, an audio speaker 114, and a pointing device 116 such as a mouse or trackball. In the preferred embodiment, the user interface 106 also includes a keyboard 118 for entering text and a printer 119. The scanner 108 is used to scan in paper based data entry forms 120.

The computer memory 104 stores a number of different programs, sometimes herein called procedures, and data structures. Whenever a paper based data entry form is scanned by scanner 108, the resulting image file 132 is stored in computer memory 104. A set of procedures collectively called the "Form Tool" are used to generate a computer based data entry form that is based on the scanned paper based data entry form.

More specifically, the Form Tool 134 stores data in a form definition data structure 136 representing all the objects and object properties required to represent a computer based data entry form, and that data structure 136 is stored as a "Form Definition File" in the computer memory 104. The form definition data structure 136 in the form definition file is then converted by a "compiler" into a "compiled form" 140 for use by a set of data collection procedures collectively called the "Char Tool" 150. The form definition file is preferably a text file editable using conventional text editor programs, while the compiled form 140 is a binary file that is not editable using conventional text editor programs.

The Form Tool 134 also contains procedures for passing a list of all voice commands defined for a form to a procedure herein called the Voice Tool 170. The Voice Tool 170 generates a set of Voice Syntax Files 158 and one Voice Dictionary file 159 for each data entry form. The Voice Dictionary file 159 for a particular data entry form stores phoneme strings that describe the pronunciation of words associated with various form sections, textboxes and buttons as well as form navigation commands for moving between sections of the data entry form and other global commands common to all data entry forms. To the extent possible, the phoneme strings in the voice dictionary file 159 are obtained by the Voice Tool 170 from a standard word to phoneme transcription dictionary 152 of several tens of thousands of commonly spoken words. For words not in the Standard Voice Dictionary 152 but specified during the form definition process, phoneme strings to be included in the voice dictionary 158 are generated using a set of pronunciation rules incorporated in a word to phoneme translator 153. For each word in the defined menu items, the Voice Dictionary File 159 stores several alternate phoneme strings that represent alternate pronunciations of that word.

The Voice Tool 170 generates a separate Voice Syntax File 158 for each distinct context in a data entry form. Each Voice Syntax File 158 represents all the legal voiced commands that a user can specify at a particular point in the data entry process. More particularly, each Voice Syntax file 158 includes references to all the words in the Voice Dictionary file 159 that are candidates for speech recognition, and also specifies all the different words and word orderings that can be used to make various particular data entries. For instance, after selecting a particular form section, the corresponding voice syntax file will include all syntax strings for all voiced commands that are "legal" from that position in the form. At any point in the process of entering data in a particular data entry form, words spoken by an end user are interpreted using the Voice Dictionary file 159 for the entire data entry form, the Voice Syntax File 158 for the context currently selected or specified by the end user's previously entered commands, and a Voice Model 172 (see FIG. 3) appropriate for the end user.

Figure 3:
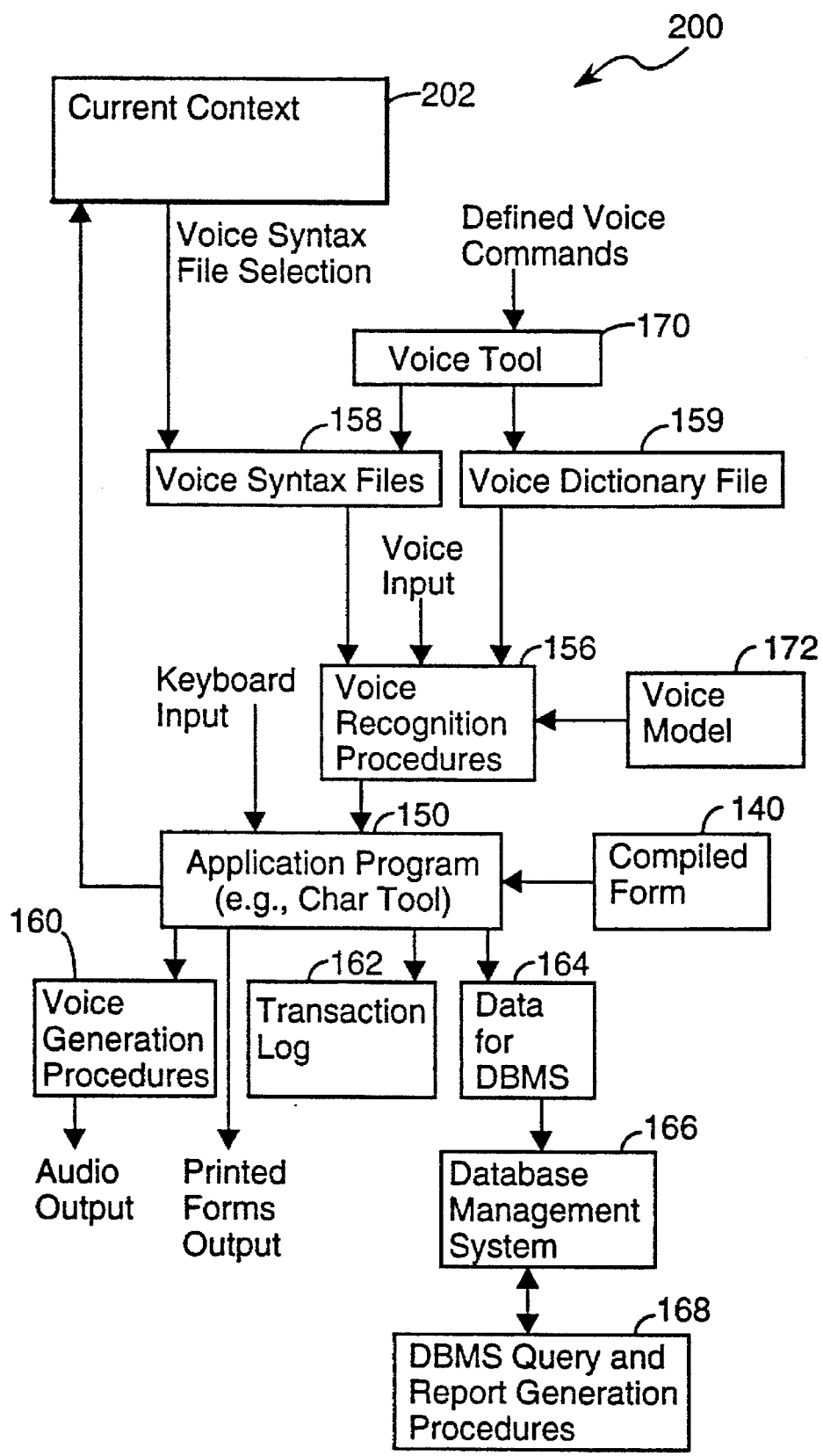
FIG. 3 depicts an end user subsystem using speech recognition in accordance with the present invention.

Referring to FIGS. 1 and 3, after a computerized data entry form has been defined and stored in compiled form 140, end users utilize the computerized data entry form for data entry. The Char Tool procedures 150, or the procedures of any other application program using speech recognition, control the data entry process. In particular, based on the form being used and the section, if any, that the user has selected, the Char Tool procedures 150 select one of the previously defined Voice Syntax files, which establishes the set of legal spoken word inputs for that context. The selected Voice Syntax file governs the operation of the speech recognition procedures 156 until another Voice Syntax file is selected for a different form context. A new voice syntax file (context) is loaded by the Char Tool procedures 150 each time the user enters a new section of a data entry form.

The speech recognition procedures 156 utilize the Voice Syntax files and Voice Dictionary file 159 described above, which define a rule base for interpreting words spoken by an end user (speech inputs). The speech recognition procedures also utilize a Voice Model 172 (of which there may be several, typically including at least one voice model for female speakers and one for male speakers) that stores data representing the relationships between measurable acoustic information (from speech) and phonemes.

When the speech recognition procedures 156 match an end user's spoken input with an entry in the currently selected voice syntax file, the speech recognition procedures return to the Char Tool 150 a value that directly identifies a corresponding input value or user command, which may indicate selection of an object in the data form or may be a form navigation command. The Char Tool procedures 150 also receive information about the specific words spoken by the end user, but in most contexts that information is not used. In an alternate embodiment of the present invention, the Char Tool procedures 150 use the detailed information about the end user's spoken words so as to enter dictated sequences of words into data entry fields in the data entry form.

A set of Voice Generation procedures 160 are optionally used to verbally confirm the end user's verbal commands. Verbal confirmation helps the end user to catch and correct errors made by the speech recognition procedures 156.

The Char Tool 150 accepts keyboard and/or pointer inputs from end users as well as spoken inputs. Once an end user has completed entering data in a form, the entered data is stored both in a transaction log 162 and as a set of data 164 to be stored in specified fields of a database in a database management system 166. As is standard, data stored in the database management system is accessible through a set of database query and report generation procedures 168.

FIG. 2 depicts an example of a paper based data entry form. As is the case for many data entry forms, the form is divided into a number of distinct sections, some of which call for checking various boxes applicable to a particular data entry situation, some of which call for entry of text and/or numbers, and some of which may call both for checking boxes and entry of text and/or numbers. Furthermore, most, although not necessarily all, sections of a data entry form include a title or label that helps the user identify the form section.

In the preferred embodiment, each aspect of a data entry form is defined as an "object". Thus, logical sections of the data entry form are each objects, each checkbox button and its associated text or fill in line is an object, each text box for entry of data is an object, and fixed text labels for form sections and text boxes are also objects. Each object has a specified physical location or position (e.g., position of its top left corner) and extent (i.e., height and width) within the form. Each object also has a set of specified properties including (A) links for linking the object to a specified field in a database, and (B) speech input data indicating word sequences for end user voiced selection of the object.

For each object in the data form, the form tool user specifies all necessary voice commands and keywords in an object "property" dialog window. As will be described in more detail below, the Form Tool 134 and Voice Tool 170 procedures (see FIG. 1) generate a Voice Dictionary for the entire form and a Voice Syntax file 158 for each context (e.g., section) of the data form based on the text of the specified commands and keywords.

Data Entry by End User Voice Input

Referring to FIG. 3, an end user subsystem 200 in the preferred embodiment includes a Voice Dictionary file 159 that stores phoneme strings that describe the pronunciation of words associated with various form sections, textboxes and buttons as well as the pronunciation of words used in navigation commands common to all data entry forms. Navigation commands include words such as "cancel," "close," "remove," and so on.

To the extent possible, the phoneme strings in Voice Dictionary file 159 are selected from a standard dictionary of several tens of thousands of commonly spoken words. For words not in the standard dictionary but specified during the form definition process, phoneme strings to be included in the Voice Dictionary file 159 are generated using a set of pronunciation rules.

To implement speech recognition without requiring the end user to learn about computer technology, the end user subsystem 200 allows end users to say as little or as much as he/she wants so long as he/she uniquely identifies one of the available items in each context. For example, if the items listed in a menu are "in the left eye," "in the right eye," and "in both eyes," the voice syntax for one specified menu item allows the user to select the first item by saying "left," "left eye," "the left," or "in the left eye." All these possible syntaxes are automatically generated by the voice tool 170 and are stored in the voice syntax files 158.

The current context 202 of the data entry process defines which Voice Syntax file 158 is to be used to decode the next voice input. The context 202 is dynamically updated by the application program (of which Char Tool 150 is just one example) during data entry. Each Voice Syntax file 158 includes references to all the words and/or phrases in the Voice Dictionary file 159 that are candidates for speech recognition when that Voice Syntax file 158 is selected for use (i.e., when the application program 150 sets its context value to that associated with the Voice Syntax file 158). The use of a separate Voice Syntax for each data entry context helps to limit the number of words in the Voice Dictionary that need to be compared with an end user's speech inputs, and reduces the number of wrong matches made.

During the data entry process, the display is constantly updated to let the user know the set of available choices for user selection via spoken input or otherwise, as well as to show the data previously entered in the form section last selected by the end user. When the end user speaks, the speech recognition procedures 156 respond by sending a list of recognized words and a "parse tag" to the application program. The parse tag identifies the spoken menu item or form object without unnecessary detail. For instance, regardless whether the end user says "left," "left eye," "the left," or "in the left eye," the application program receives the same "left" parse tag, which identifies a menu item, without additional analysis by the application program.

Figure 4A:
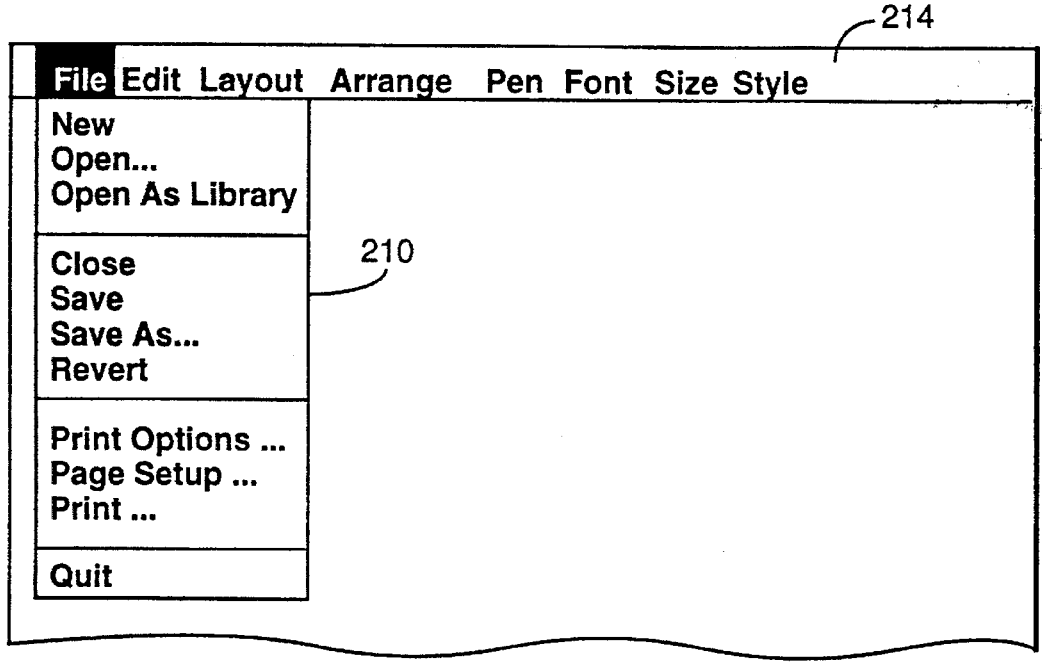
FIGS. 4A and 4B depict pull down menus for an application program, depicting typical contexts in Which the speech recognition syntax generation of the present invention may be used.
Figure 4B:
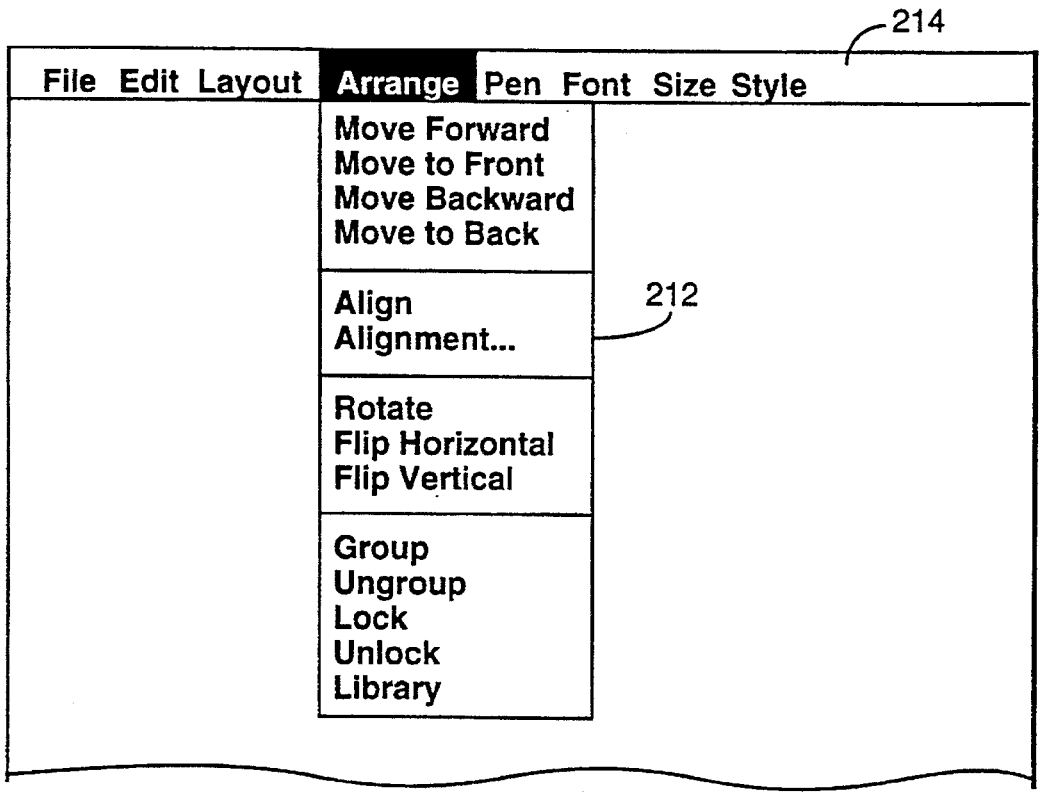

FIGS. 4A and 4B show pull down menus 210, 212 associated with a drawing program. Each such pull down menus can, when using the present invention, be defined as a distinct context, with the items in the main horizontal menu 214 being used as navigation commands available for selection within all pull down menu contexts.

Figure 5A:
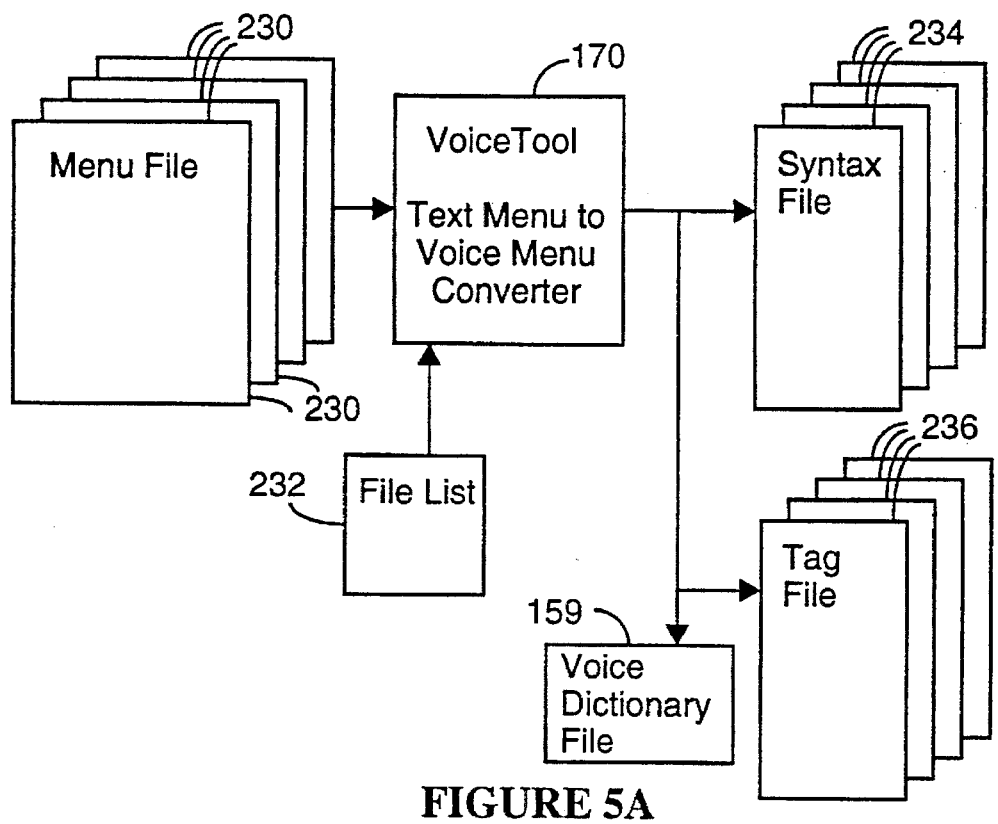
FIGS. 5A and 5B depict data structures used by the syntax generator in the preferred embodiment of the present invention.

Referring to FIG. 5A, the input to the Voice Tool 170 is a set of menu files 230, each menu file representing all the predefined input values for one context associated with the application program (which is Char Tool 150 in the example show in FIG. 3). Thus, a distinct menu file 230 is provided for each distinct context of the application program. The menu files 230 to be processed are identified by a file list 232.

Each menu file 230 is, in the preferred embodiment, a text file in which each line represents a distinct predefined input value and contains a sequence of words that represent the longest verbal expression associated with that input value. Predefined input values are often herein called menu items for convenience, even though some or all the input values may not be "menu items" in the standard usage of that term. A line in a menu file is marked with an initial left parentheses "(" if the person using the Voice Tool 170 has determined that selection of the associated menu item must be accomplished by speaking all the words in that line.

For each menu file 230, the Voice Tool 170 generates a syntax file 234 and a tag file 236. The syntax file contains one syntax statement for each input value listed in the menu file 230, plus a final statement called an S rule. The standard format for a syntax statement is Tagvalue→wordseq1|wordseq2|wordseq3| . . .

where Tagvalue is a "tag" that is passed back to the application program (e.g., Char Tool 150) when a spoken input matching that line is recognized, and wordseq1, wordseq2, wordseq3 are alternate word sequences associated with the input value.

The S rule is simply a statement representing the "OR" of all the Tagvalues:

S→tag1|tag2|tag3| . . .

where S is True if a user's verbal input matches any of the syntax statements in the syntax file. The tag file 236 corresponding to each menu file 230 is simply a list of the tags for the syntax lines in the corresponding syntax file 234. There is one tag for each menu item, and the tags are in the same order as the menu items. This makes it easy for the application program, when it receives a tag value from the speech recognition system, to determine which menu item was spoken.

The Voice Tool 170 also generates a voice dictionary file 159 whose contents define a set of phoneme sequences for every distinct word in all the menu files 230.

For an application program that includes a "dictation mode" context, the Voice Dictionary file 159 will include entries for all the words allowable in both the dictation mode context and in all the other input contexts associated with the application program. Preferably, the speech recognition system is put in a syntax rule free mode when the application program is in a dictation mode. When the field of use for the dictation is well defined, such as for patient medical histories in a hospital admittance form, it is often possible to include less than one thousand words in the dictionary file 159 to support that context.

Figure 5B:
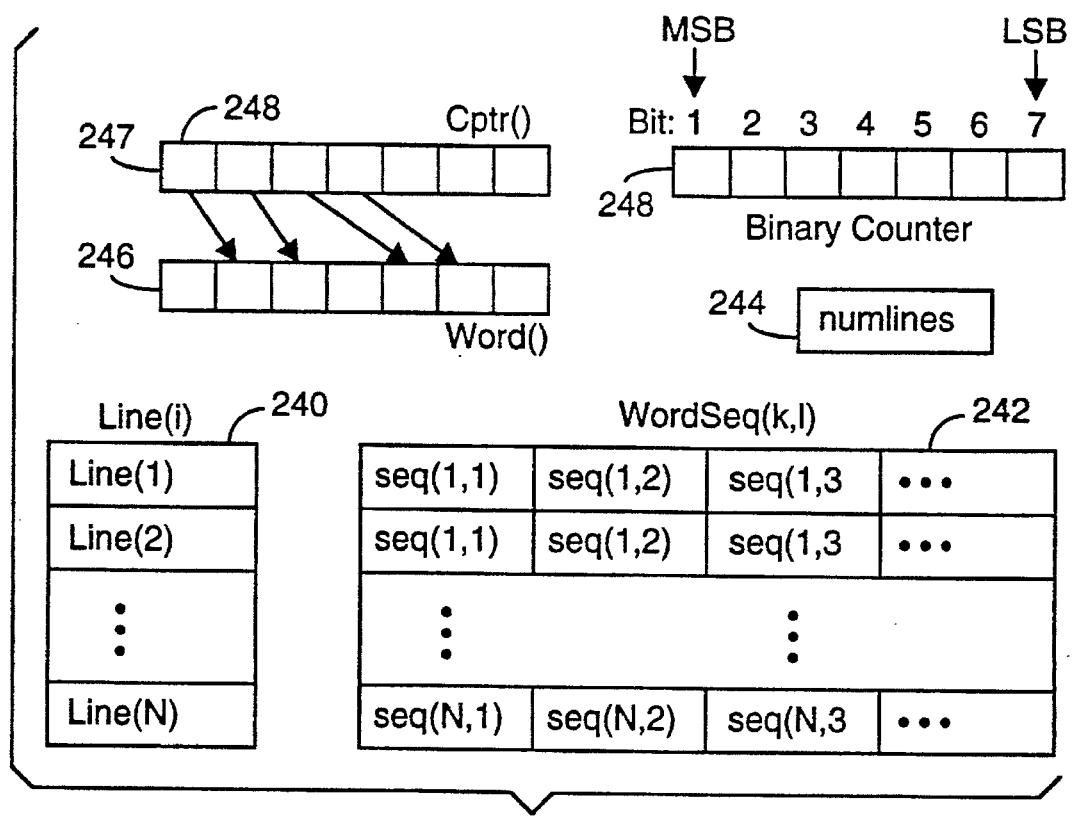

Referring to FIG. 5B, the primary data structures used to generate a syntax file 234 from a menu file 230 are a Line() data structure 240 that is used to store a copy of a menu file in memory, and a WordSeq() data structure 242 that is used to store word sequences generated during the syntax statement generation process. Each row of the WordSeq() data structure 242 corresponds to one menu item in the menu file 230 being precessed. A "numlines" register 244 stores a value indicating the number of menu items in the menu file 230 being precessed. The Word() array 246 is used to store the words from one menu item while it is being processed and the Cptr() array 247 is used to store pointers to "content" words in the Word() array. Finally, a binary counter 248 is defined with bit 1 being defined as its most significant bit, bit 2 as its next most significant bit, and so on.

Figure 6:
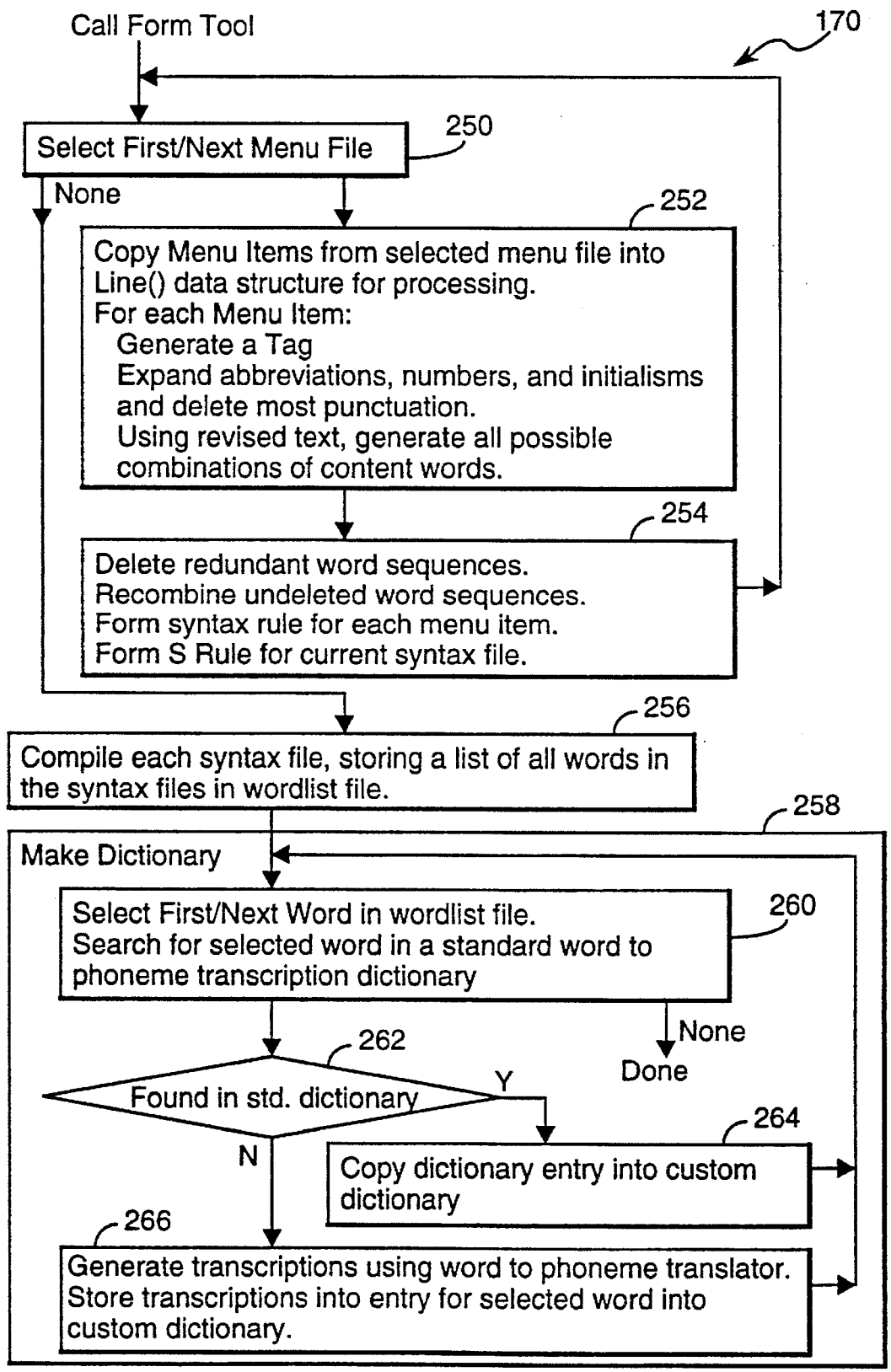
FIG. 6 is a flow chart of the procedure for converting a set of "menu files" into a set of syntax files in the preferred embodiment of the present invention.
Figure 7A:
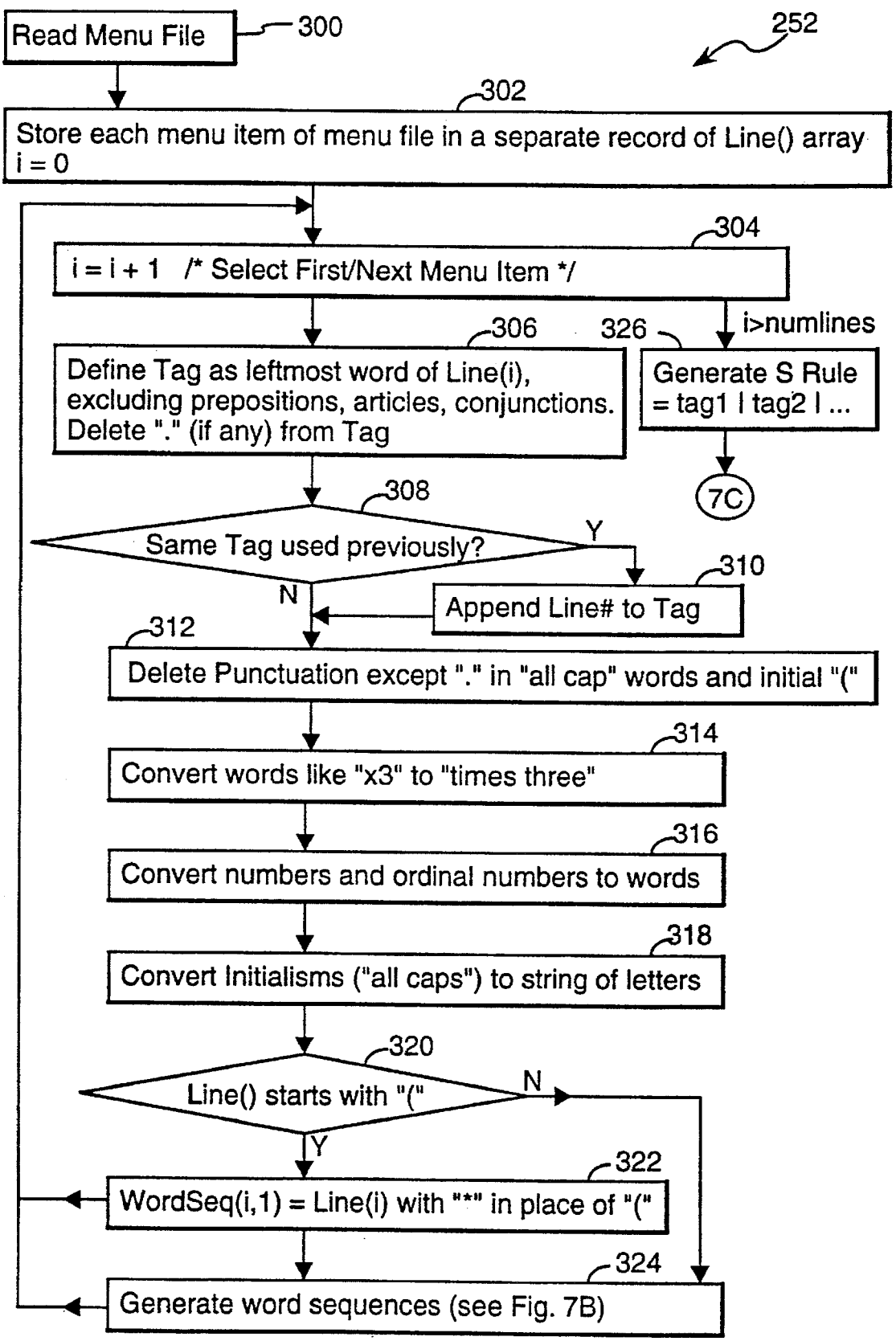
FIG. 7–7D are a detailed flow chart of the procedure for processing the predefined input values for a single defined context in the preferred embodiment of the present invention.
Figure 7B:
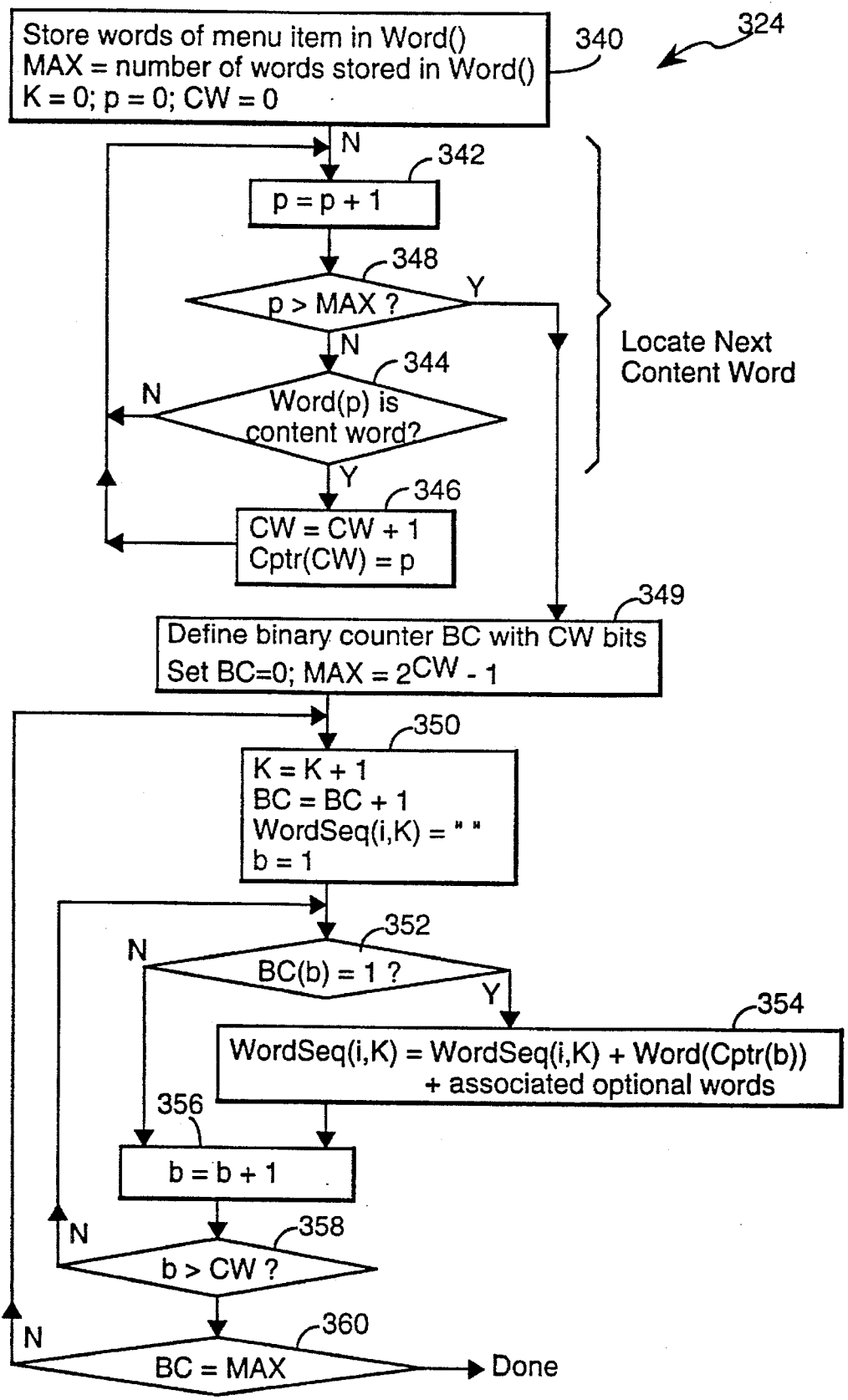
Figure 7C:
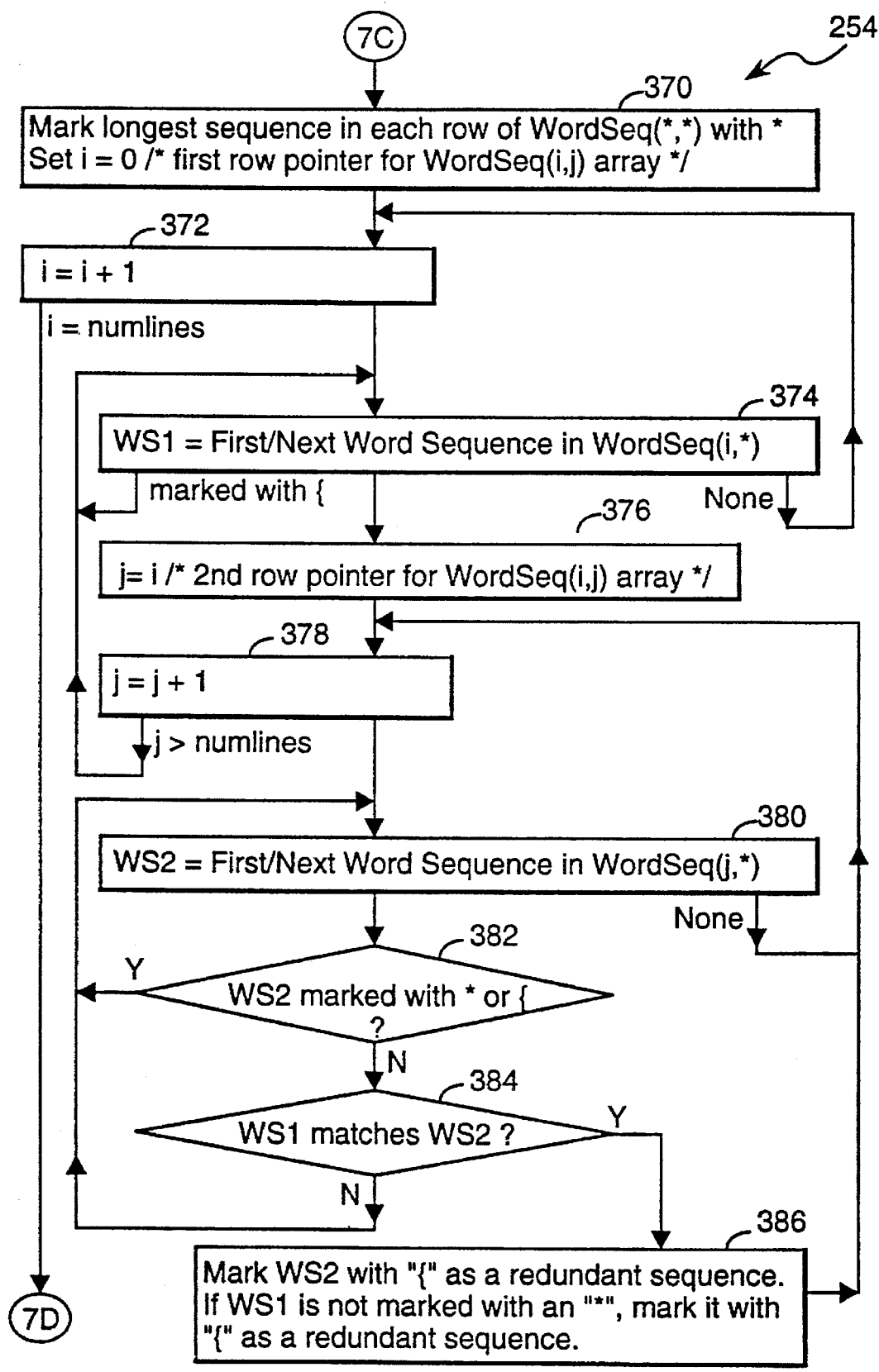
Figure 7D:
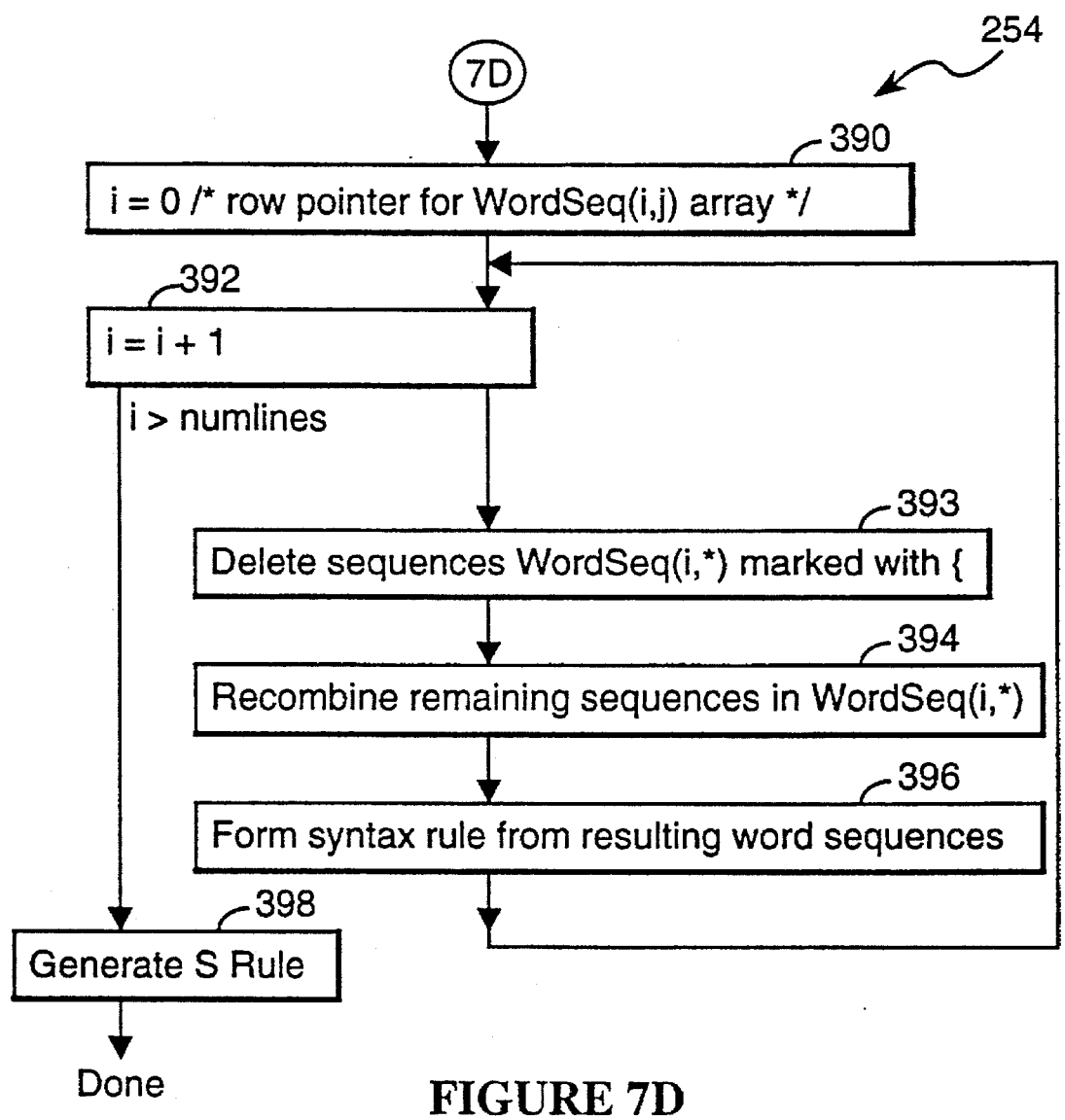
Figure 7:
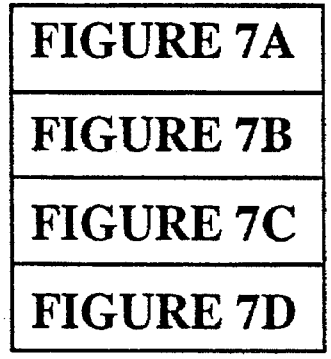

Referring to FIGS. 5B, 6 and 7, the Voice Tool procedure 170 will first be described in a general manner with reference to FIG. 6, and then certain aspects of the procedure will be described in more detail with reference to FIG. 7.

The Voice Tool procedure 170 begins by selecting a menu file 230 from the file list 232 (250). Then, the menu items in the selected menu file are copied into the Line() data structure, with each menu item being copied into a different entry of Line(). This process also determines the number of menu items in the menu file, which is then stored in the numlines register 244. Next, for each menu item, a tag value is generated and stored in a tag file 236. Then the text of the menu item is revised, if necessary, by expanding certain abbreviations, expanding numbers and ordinals into their equivalent full word text, converting initialisms into sequences of letters, and deleting most punctuation. Finally, the resulting revised text for each menu item is used to generate all possible sequences of input words that could potentially be used to select the menu item (252). Step 252 is described in more detail below with reference to FIGS. 7A and 7B.

"Content words" are defined for the purposes of this document to mean words other than prepositions, articles and conjunctions. The prepositions, articles and conjunctions that are treated as "non-content words" in the preferred embodiment are as follows:

prepositions: at, between, by, for, from, in, into, of, on, through, to, with articles: a, an, the conjunctions: and, but, or, nor After all the menu items in the selected menu file have been processed and the associated word sequences have been generated, the next step is to delete all redundant word sequences. Two word sequences are considered to be redundant when the two word sequences satisfy predefined match criteria. In the preferred embodiment of the present invention, the predefined match criteria are (A) that both word sequences have the identical content words in the identical order, and (B) that non-content words are ignored for purposes of determining which word sequences are redundant. Thus when two words sequences can have identical content words in the identical order, but different non-content words, the preferred embodiment of the present invention identifies those two word sequences as being redundant. In other embodiments of the present invention, different predefined match criteria could be used.

Whenever the same sequence of content words is included in the word sequences generated for more than one menu item, that sequence of content words is deleted for all menu items because it cannot be used to uniquely identify any menu item. After the redundant word sequences have been deleted, the remaining word sequences for each menu item are recombined, if possible, to reduce the number of syntax terms, and the resulting word sequences are used to form the syntax statement for that menu item. After all syntax statements for a menu file are generated, an S Rule is generated for the syntax file (254). Step 254 is described in more detail below with reference to FIGS. 7C and 7D.

After syntax and tag files have been generated for all the menu files (252, 254), the "source syntax files" are compiled using a commercially available voice syntax compiler, such as the compiler provided in the Phonetic Engine®) (a trademark of Speech Systems Incorporated) 500 Speech Recognition System by Speech Systems Incorporated (256). The resulting files are called compiled syntax files.

The compilation process (256) produces, as a side product, a list of all the words found in the syntax files 232. At step 258 a Voice Dictionary file 159 is generated from that word list.

The Voice Dictionary file 159 is generated as follows. One word at a time from the word list is selected, and a standard word to phoneme transcription dictionary 152 (see FIG. 1) is searched to determine if the selected word is included in the dictionary (260). If the selected word is found in the standard dictionary (262), the dictionary entry for the selected word is copied into a custom Voice Dictionary File 159 (264).

If the selected word is not found in the standard dictionary (262), transcriptions of the selected word are generated using a commercially available word to phoneme converter 153 (see FIG. 1), and the resulting transcriptions are copied into the custom Voice Dictionary File 159 (266).

This process is repeated for all words in the word list, and the resulting Voice Dictionary File 159 is then saved for use by end users.

Referring to FIG. 7A, a menu file 230 is processed as follows to produce a source syntax file. The menu file is read (300) and each menu item in the menu file is stored in a separate record of the Line() array (302). A pointer i is initialized to zero (302) and then incremented (304) at the beginning of an instruction loop. Each pass through this loop processes one menu item in the menu file.

The tag for each menu item is defined as the left most word in the Line(i) record, excluding prepositions, articles and conjunctions. If the tag includes any periods, those are deleted (306). If the same tag was previously used for another menu item in the same menu file (308), the line number of the current menu item is appended to the previously constructed tag to generate a unique tag value (310).

Next, all punctuation is deleted from the current menu item, except periods in words formed from capital letters separated by periods, and a left parentheses at the beginning of the menu item (312). A left parentheses at the beginning of the menu item is used to indicate that the only acceptable verbal input to select the corresponding menu item is one that states all the words of the menu item in sequence.

At step 314, certain abbreviations are expanded to their full text equivalent, the primary example in the preferred embodiment being that the "times" symbol is converted to the word "times" followed by a space. The symbol "x3" is converted to "times three".

At step 316, numbers and ordinals up to a predefined maximum value (e.g., 9,999) are converted to their full text equivalents. At step 318, initialisms, if expressed in the menu item as capital letters separated by periods, are converted into a list of letters separated by spaces. The word "I.B.M." is converted to "1 B M". One special exception is that whenever a letter in an initialism is the same as the preceding one, it is made optional. Thus, the initialism "H.E.E.N.T" is converted to "H E (E) N T". The reason for making the second occurrence of a doubled letter optional is because the second letter is often skipped or slurred together with the first when the initialism is spoken.

At step 320 the menu item is tested to see if it starts with a left parentheses. If it does, a syntax statement having a single word sequence is generated for the menu item (322) having all the words of the menu item in sequence, and the initial left parentheses is replaced with an asterisk. Otherwise, the word sequence generation procedure shown in FIG. 7B is executed (324) to generate a set of identifying word sequences for the current menu item.

The word sequence generation procedure 324 shown in FIG. 7B processes a single menu item. The basic methodology of the word generation procedure is as follows. A binary counter is defined with as many bits as the current menu item has content words. For every non-zero value of the binary counter, a distinct word sequence is generated. In particular, the bit values of the binary counter determine which content words in the menu item are included in the word sequence, such that when the first bit of the binary counter is equal to 1 the first content word of current menu item is included in the word sequence, and when it is equal to zero the first content word is not included in the word sequence; when the second bit of the binary counter is equal to 1 the second content word of current menu item is included in the word sequence, and when it is equal to zero the second content word is not included in the word sequence; and so on. Thus, if the menu item being processed has four content words, and the binary counter has a value of 0101, then the second and fourth content words of the menu item are included in the corresponding (fifth) word sequence generated for the menu item.

Referring to FIG. 7B, the Words of the menu item being processed (herein called the current menu item) are stored individually in an array called Word() 246, a variable MAX is set equal to the number of content words in the current menu item, and variables K, p and CW are initialized to zero (340).

The meaning of these variables, and some others used in this procedure, are as follows:

p: an index into the Word() array.

CW: the number of content words in the menu item; CW is also used as a counter and index into the Cptr array 247 while the number and location of the content words in the Word() array is being determined.

MAX: initially used to store the number of words in the Word() array; then used to store a number equal to $2^{cw}-1$, which is the number of potential identifying word sequences to be generated for the current menu item.

BC: a binary counter 248, whose bits are used to determine which content words to include in each generated word sequence.

b: an index for the bits of the BC binary counter.

K: an index into the WordSeq() array identifying the entry in the current row of WordSeq() to be generated.

To help follow the operation of this procedure, we will show how the menu item

P1 C1 C2 P2 C3 C4 P3 is processed by the procedure of FIG. 7B, where P1, P2 and P3 are non-content words, and C1, C2, C3 and C4 are content words. Note that the terms "content word" and "non-content word" are defined above.

After initialization at step 340, the word sequence generation procedure 324, steps 342 through 348 sort through the words in the Word() array to determine how many content words are stored in the Word() array and where they are located. In particular, the procedure selects the first or next word in the Word() array (342) and tests that word to see if it is a content word (344). If so, the content word counter CW is incremented and a pointer to the content word is stored in Cptr(CW) (346). If not, the next word in the Word() array is selected (342). Steps 342 through 346 are repeated until the last word in the Word() array has been processed (348).

Once all the words in the Word() array have been processed, CW is equal to the number of content words in the Word() array and Cptr(1) through Cptr(CW) point to the content words in the Word() array.

Next, a binary counter BC with CW bits is defined and initialized to a value of zero. In addition, the variable MAX is set equal to $2^{CW}-1$, which is the number of word sequences to be generated (349).

Each new word sequence is initialized by incrementing the binary counter, incrementing the WordSeq index K, storing an initial blank space in the current word sequence, WordSeq(i,K), and initializing the bit index b to 1 (350). If the bit value of the binary counter corresponding to the bit index b is equal to 1 (352) the corresponding content word, Word(Cptr(b)), and its associated optional words are appended to the end of the word sequence being generated (354).

In the preferred embodiment, the non-content words associated with each content word are all the non-content words (if any) following the content word until either another content word or the end of the menu item is reached, except that the first content word in the menu item also has associated with it any initial non-content words in the menu item that precede the first content word. Non-content words are marked as being optional by enclosing each optional word in parentheses when it is stored in the word sequence being generated.

The bit index b is incremented (356) and then tested to see if it is larger than the number of content words in the current menu item (358). If not, the bit of the binary counter corresponding to the value of the bit index b is checked (352) and if it is equal to 1 the corresponding content word, Word(Cptr(b)), and its associated optional words are appended to the end of the word sequence being generated (354). This process continues until the bit index b exceeds the number of content words in the current menu item (358). At that point, the current word sequence is complete, and the procedure starts generating the next word sequence at step 350 so long as the number of word sequences generated so far is less than the total number (i.e., MAX) to be generated (360).

Note that all word sequences generated for a menu item are stored in a row of the WordSeq() array 242 associated with that menu item, with each word sequence generated for a single menu item being stored in different columns. The words in each word sequence are preceded by a blank space to provide a place for marking some word sequences for deletion and others for protection during subsequent processing of the word sequences.

The full set of fifteen word sequences generated by this procedure for the menu item

P1 C1 C2 P2 C3 C4 P3 are as follows:

| BC Value | Word Sequence |
| --- | --- |
| 0001 | C4 (P3) |
| 0010 | C3 |
| 0011 | C3 C4 (P3) |
| 0100 | C2 (P2) |
| 0101 | C2 (P2) C4 (P3) |
| 0111 | C2 (P2) C3 C4 (P3) |
| 1000 | (P1) C1 |
| 1001 | (P1) C1 C4 (P3) |
| 1010 | (P1) C1 C3 |
| 1011 | (P1) C1 C3 C4 (P3) |
| 1100 | (P1) C1 C2 (P2) |
| 1101 | (P1) C1 C2 (P2) C4 (P3) |
| 1110 | (P1) C1 C2 (P2) C3 |
| 1111 | (P1) C1 C2 (P2) C3 C4 (P3) |

Other equivalent procedures can be used to generate all the possible word sequences of content words in a specified menu item.

Referring back to FIG. 7A, once all the menu items in a menu file have been processed, the S Rule for the syntax file is generated, as described above.

Referring to FIG. 7C, the procedure for eliminating redundant word sequences is as follows. The longest word sequence in each row of the WordSeq() array is marked with an asterisk (370). This protects the full length word sequence for each menu item from deletion.

A row of the WordSeq() array is selected as the current row (372). Word sequences in the current row of WordSeq() (374) that are already marked with curly left bracket "{" are skipped. For each remaining word sequence in the current row of WordSeq() (374), herein called the "current word sequence," each word sequence in each subsequent row of WordSeq() is identified (376, 378, 380), skipped if it is already marked with an asterisk "*" or curly left bracket "{" (382) and compared with the current word sequence (384). If the two word sequences have identical sequences of content words (384), the second of the word sequences is marked for deletion with a left curly bracket "{" (386). The first of the compared word sequences is also marked with a left curly bracket if it was not previously marked with an asterisk (because asterisk marked word sequences are protected from deletion). Word sequences previously marked with a left curly bracket are skipped at step 382 because those word sequences are already marked for deletion, and word sequences marked with an asterisk are skipped at step 382 because those word sequences are protected from deletion.

When matching word sequences are found, no other word sequences in the row being compared with the current row need to be checked because each word sequence within each row is unique. Thus, processing resumes at step 378 (which advances the row pointer j to a next row) after a matching sequence is identified.

Referring to FIG. 7D, once all of the redundant word sequences in WordSeq() have been marked, the syntax file generation procedure once again steps through the rows of the WordSeq() array (390, 392), deleting all word sequences marked with left curly brackets (393) in each row, recombining the remaining word sequences in the row (394) to the extent such recombining is possible, and then forming a syntax statement (also called a syntax rule) from the resulting word sequences (396).

Word sequences are combined (394) by determining that two word sequences differ by only one content word (i.e., it is present in one sequence and absent in the other), and then replacing both word sequences with a combined word sequence in which the differing content word is noted as being optional. For instance, the following two word sequences:

(P1) C1 C2 (P2)
C2 (P2)

can be combined to form the following word sequence:

(P1) (C1) C2 (P2).

After all the rows of the WordSeq() array are processed in this manner (steps 392 through 396), an S Rule for the syntax file is generated, as explained above.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A syntax rule authoring system for use in conjunction with a syntax based speech recognition system, comprising:
   a first data structure storing data corresponding to a set of user selectable predefined inputs associated with an application program;
   a second data structure storing for each of said predefined inputs an associated sequence of one or more words, wherein each said associated sequence of one or more words comprises a longest word sequence for uniquely identifying each said associated sequence's predefined input; and
   a voice syntax generation procedure, having access to said second data structure, for generating syntax rules, each generated syntax rule corresponding to a distinct one of said predefined inputs and including a representation of said longest word sequence associated with said one predefined input; at least a plurality of said generated syntax rules each including a representation of additional word sequences, each of said additional word sequences comprising a subset of said longest word sequence that uniquely identifies said one predefined input; wherein said generated syntax rules are for use in said syntax based speech recognition system.

2. The system of claim 1, said voice syntax generation procedure including:
   a word sequence generation procedure, having access to said second data structure, for automatically generating for each said predefined input a set of potential identifying word sequences, each of said potential identifying word sequences including a subset of said longest word sequence associated with said each predefined input; said word sequence generation procedure storing said potential identifying word sequences for all of said predefined inputs in a third data structure;
   a redundant word sequence elimination procedure, having access to said third data structure, for identifying redundant sets of matching word sequences in said second data structure, where each said redundant set of matching word sequences includes said potential identifying word sequences for at least two distinct ones of said predefined inputs whose word sequences satisfy predefined match criteria; and
   a second syntax generation procedure for generating said generated syntax rules, each said generated syntax rule corresponding to those of said potential identifying word sequences for a distinct one of said predefined inputs included in any of said identified redundant sets.

3. The system of claim 2,
   said potential identifying word sequences each including the corresponding longest word sequence; and
   said redundant word sequence elimination procedure including instructions for not including in said redundant sets of matching word sequences said longest word sequence in each of said sets of potential identifying word sequences.

4. The system of claim 1, further including:
   a microphone for receiving verbal inputs from a user; and
   a syntax based speech recognition subsystem, having access to said microphone and said generated syntax rules, for receiving said verbal inputs from said user and for identifying which of said predefined inputs, if any, correspond to said verbal inputs in accordance with said generated syntax rules.

5. The system of claim 1,
   wherein said application program has multiple contexts, each context having an associated set of user selectable predefined inputs represented by distinct sets of data in said first data structure;
   said second data structure defining for each context, a longest word sequence for uniquely identifying each predefined input associated with said context; and
   said voice syntax generation procedure generating a separate set of syntax rules for each said context.

6. A syntax rule authoring system for use in conjunction with a syntax based speech recognition system, comprising:
   memory for storing an application program having an associated set of user selectable predefined inputs;
   a first data structure defining for each of said predefined inputs an associated sequence of one or more words, wherein each said associated sequence of one or more words comprises a longest word sequence for uniquely identifying each said associated sequence's predefined input;
   a voice syntax generation procedure, including
      a word sequence generation procedure, having access to said first data structure, for automatically generating for each said predefined input a set of potential identifying word sequences, each of said potential identifying word sequences including a subset of said longest word sequence associated with said each predefined input; said word sequence generation procedure storing said potential identifying word sequences for all of said predefined inputs in a second data structure;
      a redundant word sequence elimination procedure, having access to said second data structure, for identifying redundant sets of matching word sequences in said second data structure, where each said identified redundant set of matching word sequences includes said potential identifying word sequences for at least two distinct ones of said predefined inputs whose word sequences satisfy predefined match criteria; and a syntax generation procedure for generating syntax rules, each said generated syntax rule corresponding to those of said potential identifying word sequences for a distinct one of said predefined inputs included in any of said identified redundant sets; wherein said generated syntax rules are for use in said syntax based speech recognition system.

7. The system of claim 6, said potential identifying word sequences each including the corresponding longest word sequence;

said redundant word sequence elimination procedure including instructions for not including in said redundant sets of matching word sequences said longest word sequence in each of said sets of potential identifying word sequences.

8. The system of claim 6, further including:

a microphone for receiving verbal inputs from a user; and a syntax based speech recognition subsystem, having access to said microphone and said generated syntax rules, for receiving said verbal inputs from said user and for identifying which of said predefined inputs, if any, correspond to said verbal inputs in accordance with said generated syntax rules.

9. The system of claim 8, wherein said application program has multiple contexts, each context having an associated set of the user selectable predefined inputs;

said first data structure storing for each context, a longest word sequence for uniquely identifying each said predefined input associated with said context;

said voice syntax generation procedure generating a separate set of syntax rules for each said context;

said application program including instructions for sending context signals to said syntax based speech recognition subsystem indicating which of said contexts is in use by said application program; and said syntax based speech recognition subsystem including instructions for receiving said context signals and for identifying which of said predefined inputs, if any, correspond to said verbal inputs in accordance with the generated set of syntax rules corresponding to said received context signals.

10. A method of generating syntax rules for use in conjunction with a syntax based speech recognition system, comprising the steps of:

storing in a first data structure data corresponding to a set of user selectable predefined inputs associated with an application program;

storing in a second data structure a sequence of one or more words for each of said predefined inputs, wherein each said associated sequence of one or more words comprises a longest word sequence for uniquely identifying each said associated sequence's predefined input; and generating said syntax rules, each said generated syntax rule corresponding to a distinct one of said predefined inputs and including a representation of said longest word sequence associated with said one predefined input; at least a plurality of said generated syntax rules each including a representation of additional word sequences, each of said additional word sequences comprising a subset of said longest word sequence that uniquely identifies said one predefined input; wherein said generated syntax rules are for use in said syntax based speech recognition system.

11. The method of claim 10, said syntax rule generating step including:

automatically generating for each said predefined input a set of potential identifying word sequences, each of said potential identifying word sequences including a subset of said longest word sequence associated with said each predefined input, and storing said potential identifying word sequences for all of said predefined inputs in a third data structure;

identifying redundant sets of matching word sequences in said third data structure, where each said redundant set of matching word sequences includes said potential identifying word sequences for at least two distinct ones of said predefined inputs whose word sequences satisfy predefined match criteria; and generating said syntax rules, each said generated syntax rule corresponding to those of said potential identifying word sequences for a distinct one of said predefined inputs included in any of said identified redundant sets.

12. The method of claim 11, said generated potential identifying word sequences each including the corresponding longest word sequence; and said redundant sets identifying step including the step of excluding from said redundant sets of matching word sequences said longest word sequence in each of said sets of potential identifying word sequences.

13. The method of claim 10, further including:

providing a microphone for receiving verbal inputs from a user; and receiving said verbal inputs from said user and identifying which of said predefined inputs, if any, correspond to said verbal inputs in accordance with said generated syntax rules.

14. The method of claim 10, wherein said application program has multiple contexts, each context having an associated set of user selectable predefined inputs represented by distinct sets of data in said first data structure;

said second storing step including storing in said second data structure, for each context, a longest word sequence for uniquely identifying each predefined input associated with said context; and said syntax generating step including generating a separate set of syntax rules for each said context.

15. A method of generating syntax rules for use in conjunction with a speech recognition system, comprising the steps of:

storing an application program having an associated set of user selectable predefined inputs;

storing in a first data structure, a sequence of one or more words for each of said predefined inputs, wherein each said associated sequence of one or more words comprises a longest word sequence for uniquely identifying each said associated sequence's predefined input;

automatically generating for each said predefined input a set of potential identifying word sequences, each of said potential identifying word sequences including a subset of said longest word sequence associated with said each predefined input, and storing said potential identifying word sequences for all of said predefined inputs in a second data structure;

identifying redundant sets of matching word sequences in said second data structure, where each said redundant set of matching word sequences includes said potential identifying word sequences for at least two distinct ones of said predefined inputs whose word sequences satisfy predefined match criteria; and generating said syntax rules, each said generated syntax rule corresponding to those of said potential identifying word sequences for a distinct one of said predefined inputs included in any of said identified redundant sets.

16. The method of claim 15, said generated potential identifying word sequences each including the corresponding longest word sequence; and said redundant sets identifying step including the step of excluding from said redundant sets of matching word sequences said longest word sequence in each of said sets of potential identifying word sequences.

17. The method of claim 15, further including:

providing a microphone for receiving verbal inputs from a user; and receiving said verbal inputs from said user and identifying which of said predefined inputs, if any, correspond to said verbal inputs in accordance with said generated syntax rules.

18. The method of claim 17, wherein said application program has multiple contexts, each context having an associated set of the user selectable predefined inputs represented by distinct sets of data in said first data structure;

said second storing step including storing in said second data structure, for each context, a longest word sequence for uniquely identifying each said predefined input associated with said context;

said syntax generating step including generating a separate set of syntax rules for each said context;

said application program generating context signals indicating which of said contexts is in use by said application program; and identifying which of said predefined inputs, if any, correspond to said verbal inputs in accordance with the generated set of syntax rules corresponding to said received context signals.

* * * * *